United States Patent [19]

Gaedcke et al.

[11] Patent Number: 5,496,403
[45] Date of Patent: Mar. 5, 1996

[54] PROCESS FOR PREPARING INORGANIC PIGMENTS OF PARTICULAR PARTICLE SIZE

[75] Inventors: Harald Gaedcke, Leonberg; Guenter Etzrodt, Stuttgart; Egon Liedek, Esslingen, all of Germany

[73] Assignee: BASF Lacke + Farben Aktiengesellschaft, Muenster, Germany

[21] Appl. No.: 571,283

[22] Filed: Aug. 23, 1990

[30] Foreign Application Priority Data

Sep. 9, 1989 [DE] Germany .................. 39 30 098.6

[51] Int. Cl.$^6$ ..................................... C09C 1/36
[52] U.S. Cl. .................. 106/400; 106/401; 106/425; 106/426; 106/427; 106/428; 106/429; 106/437; 106/484; 106/485
[58] Field of Search ................... 106/400, 401, 106/425, 426, 427, 428, 429, 437, 484, 485

[56] References Cited

U.S. PATENT DOCUMENTS

| | | | |
|---|---|---|---|
| 3,406,228 | 10/1968 | Hardy et al. ................. | 264/0.5 |
| 3,533,820 | 10/1970 | Lewis et al. ................. | 106/456 |
| 3,950,183 | 4/1976 | Weber et al. ................. | 423/13 |
| 4,276,202 | 6/1981 | Schmidberger et al. ........ | 204/290 F |
| 4,360,453 | 11/1982 | Lemanski et al. ............ | 502/209 |
| 4,379,003 | 5/1983 | Robbins et al. .............. | 148/104 |
| 4,981,819 | 1/1991 | Rinn ........................... | 501/12 |

FOREIGN PATENT DOCUMENTS 3242747  8/1983  Germany .

OTHER PUBLICATIONS

"Perry's Chemical Engineers' Handbook", Sixth Ed. pp. 8–69, 70; 20–29, 37, 39, 40.
"Spray Drying Handbook"; K. Masters, 4th Ed.; pp. 529, 530, 531, 548–551, John Wiley & Son.
"Kirk–Othmer Encyclopedia of Chemical Technology", 3rd Ed. v. 21, pp. 77, 82, 96–99.
Chemical Abstracts, vol. 104, entry 134782 (1986), no month.
Chemical Abstracts, vol. 84, entry 92287 (1976), no month.

*Primary Examiner*—Mark L. Bell
*Assistant Examiner*—Scott L. Hertzog
*Attorney, Agent, or Firm*—Keil & Weinkauf

[57] ABSTRACT

Inorganic oxide pigments (ceramics) are prepared by mixing the starting materials in the presence of water and in the presence or absence of assistants, drying and subsequent calcining in a rotary furnace by processing the starting materials in the presence of water into a pumpable suspension having particle sizes of 50%<10 μm and 100%<50 μm, dewatering the suspension by spray drying it to leave porous granules, and calcining those granules>97% from 20 to 800 μm in size.

1 Claim, No Drawings

PROCESS FOR PREPARING INORGANIC PIGMENTS OF PARTICULAR PARTICLE SIZE

The present invention relates to a process for preparing inorganic or ceramic pigments from mixed oxides.

Inorganic mixed oxide or oxidic mixed phase pigments are pigments which crystallize in a stable oxide lattice and get their color from the incorporation of colored cations in this lattice. The most important mixed phase pigments are spinel mixed phase pigments having the crystal lattice of spinel $MgAl_2O_4$, in which the magnesium and/or the aluminum is or are replaced by colored cations, e.g. cobalt blue $CoAl_2O_4$, zinc iron brown $ZnFe_2O_4$ and the inverse spinels, e.g. $(Co,Ni,Zn)_2TiO_4$ (cobalt green). There are also mixed phase pigments having a rutile lattice in which colored transition metals take the place of titanium. Inorganic oxide pigments which are used in the ceramics industry also exist in the form of compounds of oxides of the transition metals with one another or with metal oxides of elements of the main groups of the periodic table and may likewise have a spinel structure. However, they can also be based on colorless compounds such as zirconium silicate, zirconium oxide or tin oxide, whose crystal lattices contain colored transition metal ions, for example as in zirconium vanadium blue, zirconium praseodymium yellow, tin vanadium yellow and zirconium iron pink.

These oxidic compounds are basically prepared in the solid state at 800°–1400° C. by reaction of the oxidic components or of compounds which are convertible into the oxides at the calcination temperatures. To this end, a mixture of the pulverulent starting materials is exposed to the requisite temperatures in ceramic capsules or vessels in heated ovens, for example hearth-type, pusher-type and tunnel furnaces. These processes have the disadvantage that they make it very difficult to obtain a consistent quality of product, since it is virtually impossible to obtain a uniform temperature over the entire layer thickness. Rotary furnaces do not have this disadvantage; instead, however, separation of the starting mixture may occur, for example owing to different densities of the individual components, which results in products having non-reproducible compositions.

DE-A-2,320,806 describes a process for preparing inorganic or ceramic pigments wherein a mixture of the starting materials in the form of an aqueous suspension or paste having an $H_2O$ content of from 80 to 70% by weight is applied to the hot surface of a horizontal, planar ring which rotates around its center at not less than 500° C. and, as the ring completes one rotation, the mixture is heated to the formation temperature of the fired product, then calcined and thereafter removed from the surface of the ring. This process has the disadvantage that, during drying, the soluble constituents of the suspension crystallize out and accumulate at the surface and thus lead to separation and crusting, thereby rendering the formation of a homogeneous product impossible.

DE-C-3,242,747, furthermore, discloses a process for preparing inorganic pigments by calcining pulverulent mixtures of zirconium dioxide and other metal oxides or non-metal oxides with or without mineralizers and pulverizing the fired products obtained, wherein the pulverulent mixture is compacted before being calcined. The calcining can take place in hearth pusher furnaces or rotary furnaces. The process has the disadvantage that the very dense compacts are very slow to get to the required reaction temperature over their entire cross-section in the course of the subsequent calcination; that is, the outer zones get to the required temperature more quickly than the inner zones of the compact. Since the rate of crystal growth depends on the particular temperature and the time-temperature profile, this leads to undesirably nonuniform grain growth within the compact, which has an adverse effect on the properties of the pigment products.

It is an object of the present invention to provide a process for preparing inorganic oxide pigments (ceramics) by mixing the starting materials in the presence of water and in the presence or absence of mineralizers, drying and subsequent calcining in a rotary furnace, with or without subsequent milling, washing and/or drying of the fired products, which is free of the disadvantages of existing processes. The process should ensure in particular that the homogeneous mixture of the starting components survives the short drying times, that there is no separation due to uncontrolled crystallization of soluble components, that no dust is formed in the rotary furnace and scaling and caking is prevented at the same time, and that this will ensure uniform calcination.

We have found that this object is achieved by processing the starting materials in the presence of water into a pumpable suspension having particle sizes of 50%<10 μm and 100%<50 μm, dewatering the suspension by spray drying it to leave porous granules, and calcining those granules>97% from 20 to 800 μm in size.

To carry out the process according to the present invention, the starting materials are the oxides of the components of the pigments to be prepared or compounds which at the calcination temperatures are thermally converted into the oxides, in particular hydroxides, carbonates, nitrates and oxalates. The reaction components are used in a very finely divided form and admixed with sufficient water to form a pumpable suspension. In general, the suspensions have a solids content of from 20 to 40% by weight. The aqueous mixtures are then subjected to a wet milling, for example in a stirred or ordinary ball mill, or if the water-insoluble raw materials are already sufficiently fine, to a wet homogenization, for example in a stirred vessel equipped with a high-speed stirrer. Milling is complete when at least 50% of the particles have a particle size<10 μm and 100% of the particles have a particle size<50 μm (as measured by laser granulometer).

It is of course also possible to admix the starting materials with assistant materials which may also be water-soluble. Assistants are for example the known mineralizers which have a favorable effect on crystal growth. Examples of suitable mineralizers are alkali metal or alkaline earth metal halides and alkali metal phosphates and borates.

The suspension is then fed into a spray nozzle and sprayed into a spray tower in which the droplets formed solidify in free fall, without the use of shape-forming additives.

This gives granules having a porous structure. These granules are classified if necessary to remove fines and oversize, leaving at least 97% of the granules within the size range from 20 to 800 μm. Fines and oversize can be reused as starting materials for preparing the suspensions.

The granules within the size range mentioned are then calcined in a rotary furnace at a temperature which may differ with the intended end product. Owing to the particular porous structure of the spray-dried granules to be calcined, however, it is possible to carry out the calcination at lower temperatures and/or in shorter residence times—for the same quality of product—than is the case, for example, in the conventional calcination of powder mixtures. This has the advantage that it is possible at all to use indirect-heat rotary furnaces to prepare many pigments, since this type of furnace, owing to the comparative lack of heat resistance of the metal alloys used to construct the furnace tube, permits only limited calcination temperatures.

EXAMPLE 1

1000 kg of titanium dioxide (anatase), 152 kg of antimony(III) oxide, 56 kg of chromium(III) oxide and 21 kg of magnesium carbonate are suspended in 2100 l of fully demineralized water in a 5000-l vessel using a high-speed stirrer. The resulting suspension is recirculated for 6 hours through a comminutor constructed according to the rotor-stator principle (a Dispax reactor). The Dispax reactor has a capacity of 3000 l/hour. The mean size of the particles in the suspension is 0.9 μm; 99.7% of the particles are<5.0 μm and 100% of the particles are<10.0 μm. The solids content of the suspension is 38% by weight. The suspension is dried in a spray dryer 3.8 m in diameter and 6.0 m in cylindrical height by pressure atomization at 12 bar through a nozzle (diameter 1.8 mm) and drying by the counter/cocurrent principle to give a free-flowing pigment precursor consisting of small spheres having a sponge structure. The drying air, heated by direct heating, has an inlet temperature of 340° C. and an exit temperature of 150° C. The fine granules obtained have the following distribution, determined by sieve analysis: >500 μm: 0.0%; >250 μm: 6.2%; >125 μm: 82%; >90 μm: 95%; >20 μm: 99.7%. The residual moisture content is <0.5% by weight. The median granule size is 180 μm.

The finely granular product formed is conveyed by a metering screw, via a silo as intermediate store, into an indirect-heat rotary furnace. This furnace has a hot zone 5.5 m in length and is 0.37 m in internal diameter. The firing temperature is 1040° C., and the residence time in the hot zone of the rotary furnace is 30 minutes. The oxidation of the antimony from Sb(III) to Sb(V) is effected by the direct metering of nitric acid into the heated space of the rotary furnace. No caking or dusting occurs in the rotary furnace, a free-flowing bed of particles being formed, as a result of which all pigment particles are subject to the same firing temperature.

The fired product thus obtained is subjected to conventional working up comprising wet milling, filtration, drying and dry milling or dry milling with integrated sifting and homogenizing in a mixer. The end product obtained is a coloristically pure, strong ochre-colored chromium titanium pigment with a rutile structure.

EXAMPLE 2

1875 kg of titanium dioxide, 340 kg of antimony(III) oxide and 128 kg of chromium(III) oxide and 129.3 kg of magnesium nitrate are suspended in 4130 l of fully demineralized water in a 10,000-l vessel equipped with a high-speed stirrer. The suspension thus obtained is recirculated through a Dispax reactor (capacity 3,000 l/h) for 8 hours. The median size of the particles in the suspension is 1.0 μm; 95.1% of the particles are <5.0 μm, 99.0%<10.0 μm and 100%<20 μm. The solids content of the suspension is 37% by weight. The suspension is dried as described in Example 1 to give fine granules which have the following distribution: >500 μm: 1.8%; >250 μm: 19.2%; >125 μm: 81.3%;>90 μm: 92.7%; >20 μm: 100%. The rest of the processing is as described in Example 1. The end product obtained is a coloristically pure, strong reddish chromium titanium pigment.

EXAMPLE 3

50 kg of aluminum hydroxide (hydrargillite, $D_{50}$: 1.5 μm) are ball-milled with 20 kg of cobalt hydroxide and 165 l of water in a 400-l capacity ball mill for 8 hours. The grinding medium used comprised 100 kg of balls from 20 to 50 mm in diameter.

The speed is 30 r.p.m. The suspension obtained has a solids content of 29.8% by weight; 100% of the particles are<10 μm. The suspension is spray-granulated as described in Example 1 under the following external conditions:

| Pressure: | 14 bar |
|---|---|
| Nozzle diameter: | 1.1 mm |
| Inlet-gas temperature: | 330° C. |
| Exit-gas temperature: | 145° C. |

The finely granular product obtained has the following particle size distribution, determined by sieve analysis: >500 μm: 0.0%; >250 μm: 0.8%; >125 μm: 56%; >90 μm: 81%; >20 μm: 99.9%.

The finely granular product is subjected to a conventional calcination in a rotary furnace at a firing temperature of 1240° C. After calcination, the granules still have a spherical shape. The rest of the workup is carried out in a conventional manner by wet milling, filtration and dry milling. The end product obtained is a coloristically pure, strong cobalt blue pigment.

EXAMPLE 4

Example 1 is repeated to obtain an oxidic pigment having a spinel structure by intensively dispersing 108 kg of aluminum hydroxide (hydrargillite, $D_{50}$: 1.5 μm), 58.2 kg of cobalt hydroxide, 70.4 kg of chromium(III) oxide, 5.0 kg of zinc oxide and 8.4 kg of zinc chloride in 480 l of water at at least 2000 r.p.m. using a dissolver in the course of 15 minutes. The solids content of the suspension is 34.2% by weight; 100% of the particles are<10 μm.

This suspension is spray-granulated as described in Example 1 under the following external conditions:

| Pressure: | 12 bar |
|---|---|
| Nozzle diameter: | 1.1 mm |
| Inlet-gas temperature: | 340° C. |
| Exit-gas temperature: | 150° C. |

The finely granular product obtained has the following particle size distribution, determined by sieve analysis: >500 μm; 0.0%; >250 μm: 1.4%; >125 μm: 59%; >90 μm: 82%; >20 μm: 99.9%.

The finely granular product obtained is calcined at 1150° C. in a rotary furnace having a heated length of 2100 mm and a diameter of 170 mm. The residence time of the granules in the hot zone is 40 minutes. The particles form a free-flowing bed, as a result of which all the particles are exposed to the same temperature. No caking or dusting occurs in the rotary furnace, and the granular form of the material remains intact. Owing to the uniform distribution of the zinc chloride in the granules it is possible to reduce the usual temperature of 1220° C. required with conventional powder technology to 1150° C. without altering the coloristic properties of the pigment, in particular the purity. The use of indirect-heat rotary furnaces comprising metallic tubes for producing coloristically pure cobalt blue pigments has been made possible by the process according to the present invention.

The rest of the workup is carried out in a conventional manner by wet milling, filtration and dry milling. The end product obtained is a coloristically pure, strong greenish cobalt blue pigment.

EXAMPLE 5

Example 4 is repeated to produce a strong, reddish, coloristically pure cobalt blue pigment by dispersing 204.8 kg of aluminum hydroxide, 82.4 kg of cobalt hydroxide and 23.6 kg of magnesium chloride×6 H$_2$O in 450 l of water in a dissolver. The solids content is 40.8%. The rest of the processing is carried out as described in Example 4, the hot zone temperature again being 1150° C.

EXAMPLE 6

As in Example 1, the pulverulent raw materials comprising 78 kg of praseodymium oxide (Pr$_6$O$_{11}$), 10 kg of sodium fluoride, 5 kg of sodium chloride, 307 kg of silicon dioxide (D$_{50}$: 6.5 μm) and 550 kg of zirconium dioxide (D$_{50}$: 8.0 μm) are suspended in 650 l of water in a 2000-l stirred vessel, and the suspension is then milled in a stirred ball mill filled with aluminum oxide balls 1.5 mm in diameter. The suspension is repeatedly passed through the stirred ball mill until the median size of the raw material particles is 3.8 μm, when 60% of the particles are <5.0 μm, 89% of the particles are <10.0 μm and 100% of the particles are <20.0 μm. The solids content of the suspension is 59.0%. This suspension is spray-dried as described in Example 1 under the following external conditions:

| Pressure: | 18 bar |
| --- | --- |
| Nozzle diameter: | 1.1 mm |
| Inlet-gas temperature: | 320° C. |
| Exit-gas temperature: | 150° C. |

The finely granular product obtained has the following particle size distribution, determined by sieve analysis: >800μm: 0%; >500 μm: 3.1%; >250 μm: 35.4%; >125 μm: 70.6%; >90 μm: 90.9%; >20 μm: 100.0%.

The soluble mineralizers NaF and NaCl have been uniformly distributed in the granules. On further processing as described in Example 1, but at a calcination temperature of 1000° C., it is revealed that the amount of 1.6% of mineralizer used, based on the raw material mixture, produces the same growth within the pigment particles as is obtained in conventional powder technology only with an amount of 3.6% of mineralizer. A customary workup as described in Example 1 gives praseodymium yellow as end product.

EXAMPLE 7

As in Example 1, a lemon-colored rutile mixed phase pigment is obtained by suspending 978 kg of titanium dioxide (anatase), 140 kg of antimony trioxide and 126.2 kg of nickel nitrate in 1800 l of water in a 5000-l vessel using a high-speed stirrer. The rest of the processing is carried out according to Example 1. The end product obtained is a coloristically pure, strong nickel titanium pigment.

We claim:
1. In a process for preparing inorganic oxide pigments by mixing starting materials in the presence of water and in the presence or absence of assistants; drying; subsequently calcining in a rotary furnace, with or without subsequent milling; and washing with or without drying of the calcined products, the improvement which consists essentially of:

1) dispersing or milling the starting materials in the presence of water to produce a pumpable aqueous suspension wherein the solids have particle sizes of 50%<10 μm and 100%<50 μm, the particle sizes being determined by a laser granulometer;

2) dewatering the produced suspension by spraying the suspension by means of a single-fluid pressure nozzle to produce porous granules which are made up of agglomerates of the particles produced in step 1); and 3) calcining those porous granules which are>97% from 20 to 800 μm in size in a rotary furnace, the particle sizes of the porous granules being determined by sieve analysis.

* * * * *